United States Patent [19]

Schoepe

[11] 4,338,964
[45] Jul. 13, 1982

[54] SIDE INLET BALLCOCK HAVING FLOW AND STRUCTURAL IMPROVEMENTS

[76] Inventor: Adolf Schoepe, 1620 N. Raymond Ave., Fullerton, Calif. 92631

[21] Appl. No.: 220,812

[22] Filed: Dec. 29, 1980

[51] Int. Cl.³ .................. F16K 31/18; F16L 15/02
[52] U.S. Cl. .................................. 137/436; 137/443; 137/426; 138/42; 251/126
[58] Field of Search ........... 137/414, 436, 443, 625.3; 138/40, 42; 251/118, 126

[56]  References Cited
U.S. PATENT DOCUMENTS

| | | | |
|---|---|---|---|
| 1,728,177 | 9/1929 | Ehrhart | 137/436 |
| 1,737,233 | 11/1929 | Griffiths | 251/126 |
| 1,901,633 | 3/1933 | Clemmons | 137/436 |
| 3,500,879 | 3/1970 | Meyer | 251/126 |
| 3,534,830 | 10/1970 | Kaila | 137/436 |
| 3,669,138 | 6/1972 | Schoepe et al. | 137/414 |
| 4,108,202 | 8/1978 | Schoepe | 137/436 |

Primary Examiner—George L. Walton
Attorney, Agent, or Firm—Mahoney & Schick

[57] ABSTRACT

A horizontal water inlet tube is inwardly connected reversely through a valve within a horizontal valve housing and from the valve housing downwardly into a generally vertical water outlet tube. The valve is controlled by a valve control arm projecting generally horizontally from the valve housing downwardly connected through a float connector to a float vertically slideable on a float guide extending downwardly from the valve housing. A diverter at the upper end of the water outlet tube receives water flow generally horizontally from the valve housing into a pair of spaced, downward helical grooves directing the flow spirally into a pair of spaced vertical grooves for ultimate discharge downwardly through the water outlet tube. The diverter vertical grooves are larger in cross-section than the respective helical grooves and are formed by radial plates converging centrally to a cylinder at groove upper portions and an inverted cone at groove lower portions, each vertical groove occupying in the order of 120° of the outlet tube circumference. For shipment, the float guide may be pivoted upwardly at its connection to the valve housing simultaneously carrying the float and float connector without disrupting assembly placing these elements approaching horizontally parallel to the inlet tube, valve housing and valve control arm. The outlet tube is selectively disconnectable adjacent the valve housing for positioning thereof generally horizontal.

9 Claims, 9 Drawing Figures

SIDE INLET BALLCOCK HAVING FLOW AND STRUCTURAL IMPROVEMENTS

BACKGROUND OF THE INVENTION

This invention relates to a side or horizontal inlet ballcock and more particularly, to a side inlet ballcock which may have either or both of water flow improvements for noise reduction and other structural improvements for packing and shipping expediency. According to a preferred embodiment of the present invention, the side inlet ballcock may include unique means in the liquid discharge portion thereof for more perfectly controlling and generating a smoother flow path, despite the required circuitous nature thereof so as to reduce the normally resulting flow noise levels to less than has heretofore been possible in ballcocks of similar nature. Furthermore, the embodiment of ballcock may include a unique structural arrangement permitting packing and shipping thereof in a folded state of more expeditious storage and shipping form, yet it may be pivotally expanded into a final usable form quickly and easily in a completely obvious manner not requiring any special skills or knowledge.

Various forms of float actuated ballcocks have heretofore been provided for use in liquid level control in various applications thereof. Probably the most prominent use of such float actuted ballcocks has been for the required water level control in toilet flush tanks. Furthermore, due to the locations of such installations, particularly adjacent sleeping quarters of residences, the noise level of water flow through the toilet installed ballcocks has become a critical factor.

As far as float actuated ballcocks for liquid level control are concerned, two major basic forms thereof are manufactured and sold, a bottom or vertical inlet ballcock and a side or horizontal inlet ballcock. With the bottom or vertical inlet ballcock, the inlet liquid, such as water, enters the lower end thereof, travels vertically upwardly to a valve and discharges reversely vertically downwardly finally into the containing tank. With a side or horizontal inlet ballcock, the liquid enters horizontally at a side thereof, travels in this horizontal plane reversely through the valve still maintaining such horizontal oriented flow and finally the horizontal flow is turned sharply at right angles downwardly for discharge through an outlet tube into the containing tank.

Up to the present time, the float actuated ballcocks principally used in the United States for domestic application, particularly in toilet flush tank installations, have been of the bottom inlet type. Furthermore, due to the inherent structure thereof, the water flow noise levels have been more easily controlled. With the water entering vertically upwardly and being totally reversed in vertical flow path downwardly by the controlling valve, once the water begins its descent to discharge into the containing tank, it is not required to sharply change direction of flow until discharged. Thus, although the water leaving the valve and starting downwardly will have a degree of turbulence, such turbulence may be much more easily modified and virtually eliminated due to the single vertical direction of travel.

However, more recently, a domestic market in the United States has been increasingly developing for side inlet ballcocks which had only previously been used primarily in commercial applications. At the same time, there is an ever increasing foreign market for side inlet ballcocks where they are used not only commercially, but in many instances, the only ballcocks used in water level control of toilet flush tanks are of the side inlet type. Thus, the liquid or water flow noise levels in side inlet ballcocks have become of increasingly critical nature.

In side inlet ballcocks, the reduction of liquid flow noise levels is not so easily accomplished, again due to the inherent structure thereof. Up to a point, side inlet ballcocks have the identical problems to those of the bottom inlet ballcocks since they receive the liquid flow horizontally and it is completely reversed in horizontal direction by the controlling valve, but then, the side inlet ballcocks, have the additional problem of turning the liquid flow sharply at right angles downwardly for the final discharge. This greatly expands the flow turbulence problems and it becomes a major question of just how to reduce the same so that the noise levels at ultimate discharge will not be prohibitive.

Another factor of consideration with side inlet ballcocks and of a lesser problem with bottom inlet ballcocks is involved with storage and shipment thereof. Bottom inlet ballcocks, again due to their inherent structure, present a relatively long and thin contour so that the packaging thereof for storage and shipment is of a slim nature which is relatively efficient. Side inlet ballcocks, on the other hand, project markedly both horizontally and vertically so that in assembled form, they normally present a quite bulky package for storage and shipment, thereby adding to the overall cost of providing the same.

OBJECTS AND SUMMARY OF THE INVENTION

It is, therefore, an object of this invention to provide a side inlet ballcock having a unique flow diverter installed at a critical flow area thereof for the reduction of the flow level noise thereof in a relatively efficient manner. According to the principles of the present invention, a preferred embodiment of side inlet ballcock has a unique flow diverter positioned at the juncture between the valve outlet portion and the initiation of the liquid or water outlet tube. At this location, as previously discribed, the flow path is required to turn sharply at right angles, that is, from generally horizontally to generally vertically, and the flow diverter accomplishes such flow directional change in a relatively smooth and turbulance modifying manner so that the resulting vertical flow is of minimum noise producing form for discharge from the ballcock.

It is a further object of this invention to provide a side inlet ballcock of the foregoing general type and with the unique flow diverter of the present invention wherein the flow is received from the valve outlet portion by the diverter in a horizontal plane and by the formation of the diverter and the flow path established therein gradually converts the flow path from horizontal to vertical while minimizing and correcting entering flow turbulance, thereby discharging with minimal turbulence despite the sharp directional flow change. In a preferred embodiment thereof, the upper portion of the flow diverter has one or more helical grooves which receive horizontal flow from the valve outlet portion and progress vertically downwardly in a spiral path along the outlet tube finally discharging into one or more horizontally restricted, diverter vertical grooves. The diverter vertical grooves carry the flow vertically downwardly preferably with progressively expanding volume finally discharging into the remainder of the outlet tube for continued vertical flow to discharge.

It is still an additional object of this invention to provide a side inlet ballcock which, in the preferred embodiment thereof, includes unique structure permitting the same to be presented in a folded form particularly adapted for maximum efficiency in storage and shipment. Being of basic conventional form, the side inlet ballcock in normal functioning position extends markedly both horizontally and vertically so as to present a relatively bulky storage and shipping form. However, according to the principles of the present invention, various of the elements thereof are constructed for selective pivoting now presenting the ballcock, with the exception of the outlet tube thereof, as a relatively compact horizontally projecting package. Thus, by detachment of the outlet tube and likewise positioning it horizontally projecting, a relatively thin elongated package is presented for storage and shipment, dispite the fact that it may be quickly repositioned into efficiently operating form by a simple reversal of the folding and disassembling procedure.

Other objects and advantages of the invention will be apparent from the following specification and the accompanying drawings which are for the purpose of illustration only.

DESCRIPTION OF THE BEST EMBODIMENT CONTEMPLATED

Figure 1:
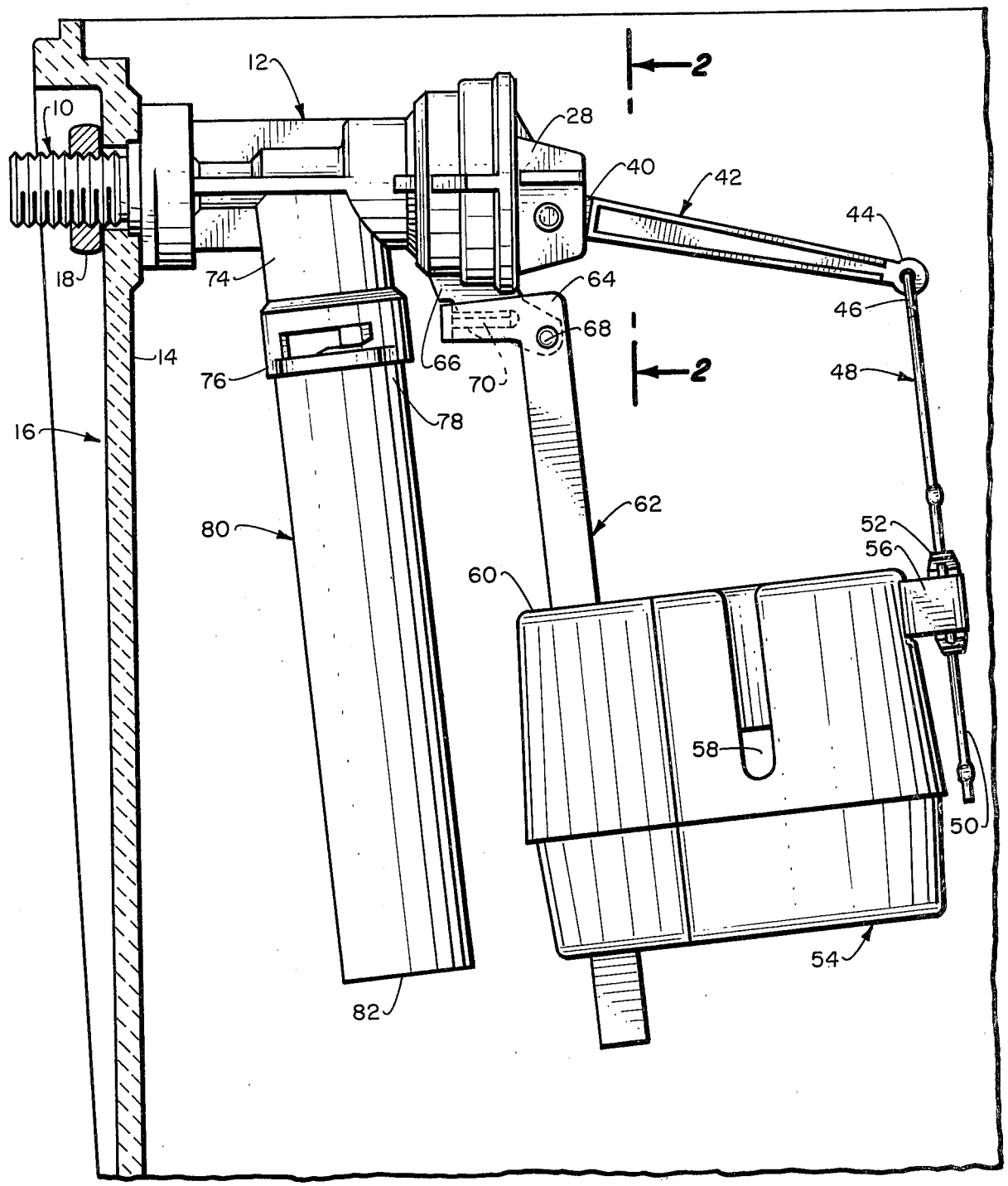
FIG. 1 is a side elevational view of a preferred embodiment of a side inlet ballcock incorporating both the outflow and structural improvements of the present invention, the ballcock being illustrated installed in a conventional toilet flush tank for controlling the water level thereof, the flush tank being shown in fragmentary, vertical section.

Referring to the drawings, a preferred embodiment of a float actuated side inlet ballcock is shown incorporating both the flow and structural improvements of the present invention. The ballcock is illustrated herein installed in a toilet flush tank for controlling the water level therein, but it is obvious that the ballcock will have many other uses for liquid level control in various tanks, containers and the like, and all such uses are contemplated. Furthermore, except for the improvements of the present invention which will be pointed out and discussed in detail below, the side inlet ballcock may be generally of somewhat conventional form constructed of usual materials and fabricated by usual manufacturing processes, all well known to those skilled in the art.

Figure 2:
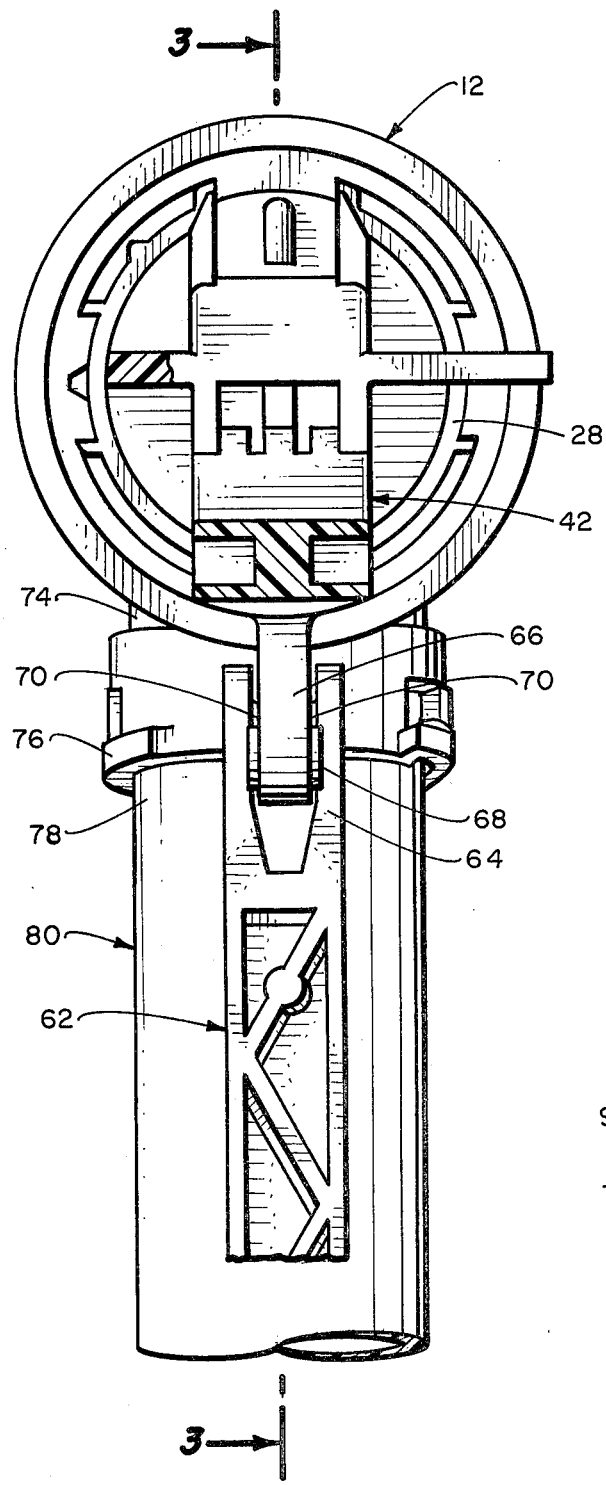
FIG. 2 is a an enlarged, fragmentary, vertical sectional view looking in the direction of the arrows 2—2 in FIG. 1.
Figure 3:
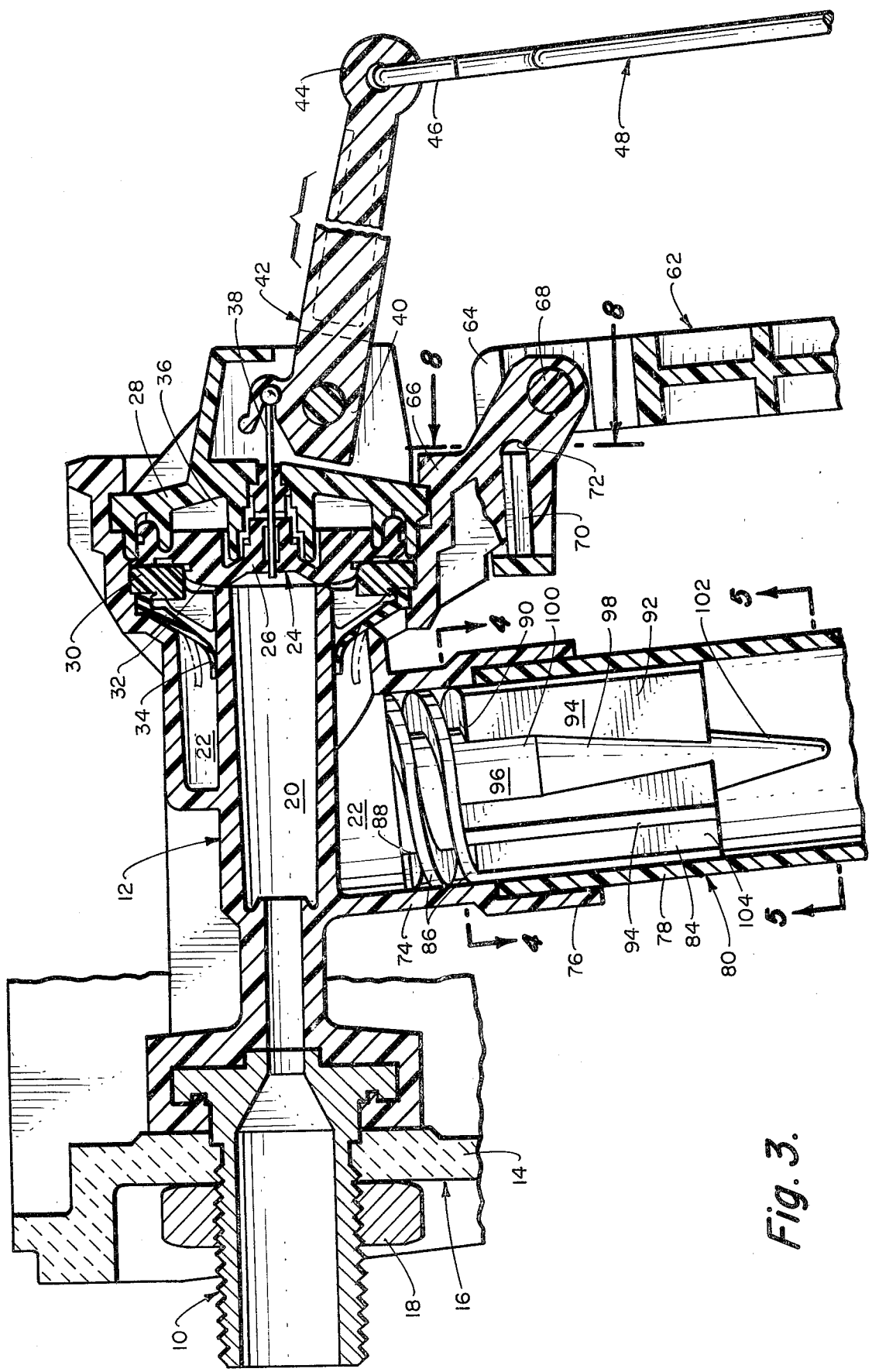
FIG. 3 is a fragmentary, vertical sectional view looking in the direction of the arrows 3—3 in FIG. 2.

Initially referring to FIGS. 1, 2 and 3, the side inlet ballcock includes a metal liquid or water inlet tube generally indicated at 10 secured in flow communication with a valve housing generally indicated at 12, both projecting generally horizontally as conventionally installed. The valve housing 12 is preferably formed of molded plastic and is molded to the inner end of the water inlet tube 10 projecting inwardly therefrom. Furthermore, in this instance, the ballcock is mounted on sidewall 14 of a toilet flush tank generally indicated at 16, the end of the valve housing abutting an inner side of the tank sidewall with the water inlet tube extending therethrough and the ballcock retained in place by a mounting nut 18 threaded on the water inlet tube abutting the outer side of the tank sidewall.

The valve housing 12 has formed therein a central horizontally extending inlet portion 20 and a surrounding angular, horizontally extending outlet portion 22. Furthermore, the valve housing 12 encloses a valve generally indicated at 24 having the end thereof horizontally opposite the water inlet 10. Thus, the inlet portion 20 of the valve housing 12 communicates at the one side with the water inlet tube 10 and at the other side with the valve 24, and the outlet portion 22 of the valve housing communicates with the valve 24 outwardly of the inlet portion.

The valve 24 is comprised of a resilient sealing member 26 retained in place by an outward, selectively removable valve cover 28 and inwardly horizontally abutting a valve seat 30 in constant flow communication with the valve housing inlet portion 20 and having flow openings 32 horizontally into the valve housing outlet portion 22. The valve seat 30, in turn, horizontally overlies a resilient anti-syphon member 34, all as shown in FIG. 3. A pilot valve 36 is formed centrally of the sealing member 26 and is controlled by a pilot pin 38 projecting through the sealing member and outwardly through the valve cover 28.

The valve 24 is of known construction and for the present purposes, it is sufficient to state that when the pilot pin 38 is moved inwardly to the position shown in FIG. 3, the sealing member 26 is moved to closed position abutting the valve seat 30 covering the valve seat flow openings 32 as to stop and seal off flow from the valve housing inlet portion 20 to the outlet portion 22. When the pilot pin 38 is moved from its position in FIG. 3 to the right relative to the valve cover 28, the flow pressure in the valve housing inlet portion 20 is permitted by the pilot valve 36 to force the sealing member 26 to the right and thereby permit flow from the inlet portion 20 reversely through the valve seat 30 and thereby reversely into the outlet portion 22. Thus, horizontal movement control of the pilot pin 38 controls the pilot valve 36 and, in turn, controls the valve 24 sealing off or permitting liquid or water flow through the valve housing 12 between the inlet and outlet portions 20 and 22 thereof, again, all in a well known manner.

The end of the pilot pin 38 projecting horizontally outwardly of the valve cover 28 is preferably ball-socket connected to a pivot end 40 of a generally horizontally extending valve control or valve actuating arm generally indicated at 42. The valve control arm 42 is preferably formed of plastic and is pivotally connected pivotal in a vertical plane to the valve cover 28, a projecting free end 44 thereof pivotally receiving an upper end 46 of a normally generally vertical, float connector generally indicated at 48. Float connector 48 is preferably formed of metal wire and has a lower portion 50 thereof selectively adjustably secured by a preferably metal, adjustment clip 52 to a float generally indicated at 54 as shown in FIG. 1.

Float 54 is preferably formed of plastic and is of somewhat usual construction including a connector bracket 56 receiving the previously mentioned float connector 48 generally vertically therethrough and retained positioned by the adjustment clip 52. The float 54 also includes the usual hollow interior in communication with an air and water opening 58 for the reception of water ballast therein in the usual manner. Still further, the float 54 has a mounting portion 60 slideably receiving a preferably plastic, normally generally vertically extending, float guide 62 therethrough.

Figure 8:
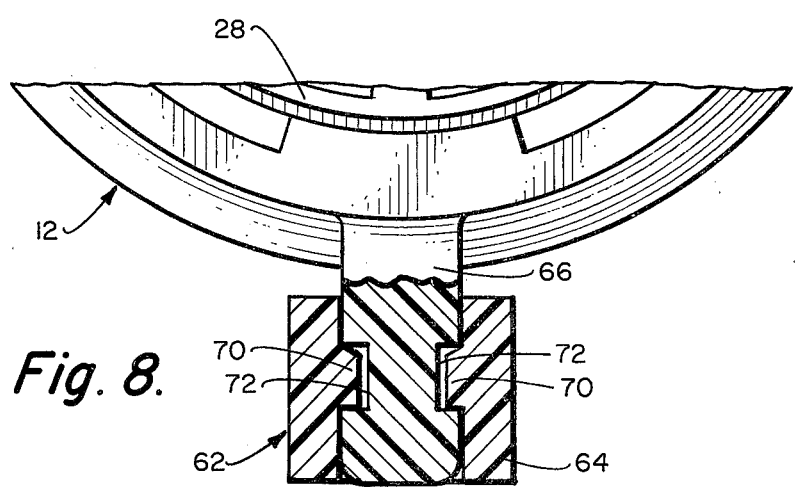
FIG. 8 is an enlarged, vertical sectional view looking in the direction of the arrows 8—8 in FIG. 3.

The float guide 62 is of uniform cross section throughout the majority of its length for the generally vertical slideable movement of the float 54 therealong, but is formed with an inverted L-shaped upper end 64 for securement to the valve housing 12 generally underlying the portion of the valve housing containing the valve 24 and the valve cover 28 as clearly shown in FIGS. 1 and 3. Important to certain of the improvements of the present invention, this inverted L-shaped upper end 64 of the float guide 62 is secured pivotal in a vertical plane to an L-shaped guide bracket 66 projecting downwardly from and formed integrally with the valve housing 12 through a horizontally extending pivot pin 68. As shown particularly in FIGS. 2, 3 and 8, the guide bracket upper end 64 is formed bifurcated and is received telescoping the valve housing guide bracket 66 with the pivot pin 68 horizontally therethrough retaining the assembly.

As stated, the float guide 62 is normally positioned relative to the valve housing 12 extending generally vertically downwardly therefrom in the position shown in FIGS. 1 through 3 and 8, and when so positioned, arcuately faced bars 70 extending inwardly from the opposite sides of the float guide upper end 64 are received in interference fit in generally horizontally extending and aligned slots 72 at opposite sides of the valve housing guide bracket 66. However, with the float guide 62 pivoted upwardly from its generally vertically extending position in vertical alignment and approaching generally horizontally parallel to the valve control arm 42 as permitted by the pivot pin 68, the float guide upper end 64 is sufficiently flexible to permit sliding of the bars 70 over the valve cover guide bracket 66 adjacent the slots 72. As the float guide 62 is pivoted downwardly toward its normally vertically extending position, the float guide bars 70 ultimately snap engage into the guide bracket slots 72 so that in this normal position, the float guide 62 is retained in its normal position, all for a purpose to be hereinafter discussed more in detail.

Referring to FIG. 3, formed integral with the valve housing 12 horizontally intermediate the valve housing is a flow discharge stub 74 in flow communication with the valve housing outlet portion 22, that is, to the left of the valve 24 and the float guide 62 as shown in FIG. 3. The flow discharge stub 74 projects generally vertically downwardly from the valve housing outlet portion 22 and is removably connected at its lower terminus 76 through a usual bayonet joint to an upper end 78 of a generally vertically extending liquid or water outlet tube generally indicated at 80. The water outlet tube 80 is preferably hollow cylindrical formed of plastic and terminating downwardly in an open discharge end 82 approximately horizontally coincident with the lower end of the float guide 62.

Figure 4:
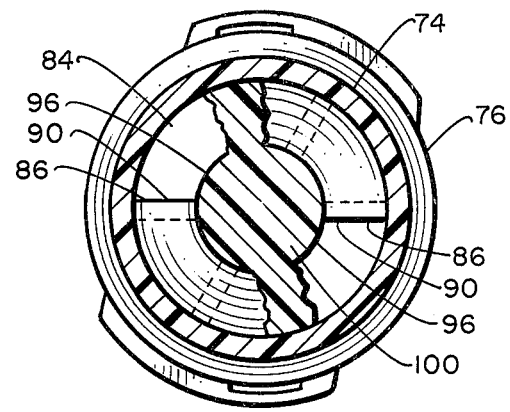
FIG. 4 is a sectional view looking in the direction of the arrows 4—4 in FIG. 3.
Figure 5:
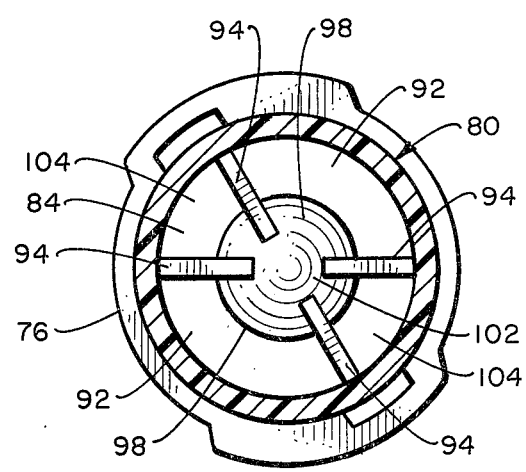
FIG. 5 is a sectional view looking in the direction of the arrows 5—5 in FIG. 3.
Figure 6:
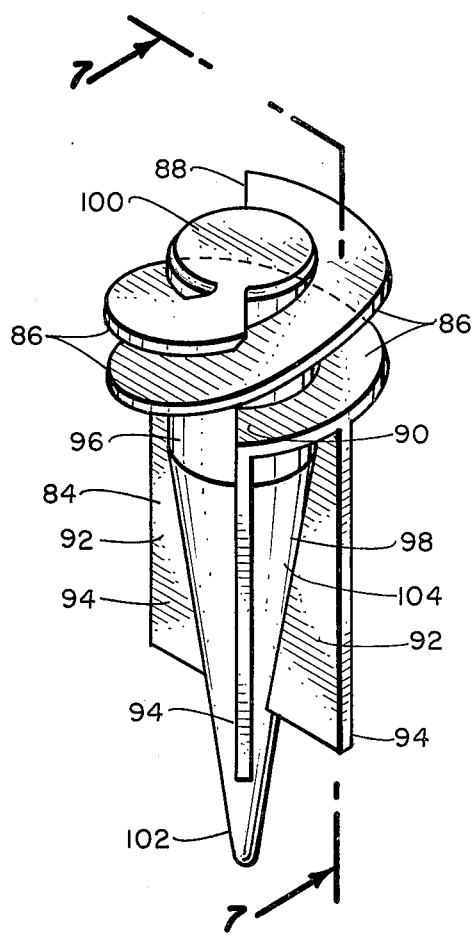
FIG. 6 is a perspective view of the flow diverter of the present invention removed from the assembly of FIG. 3.
Figure 7:
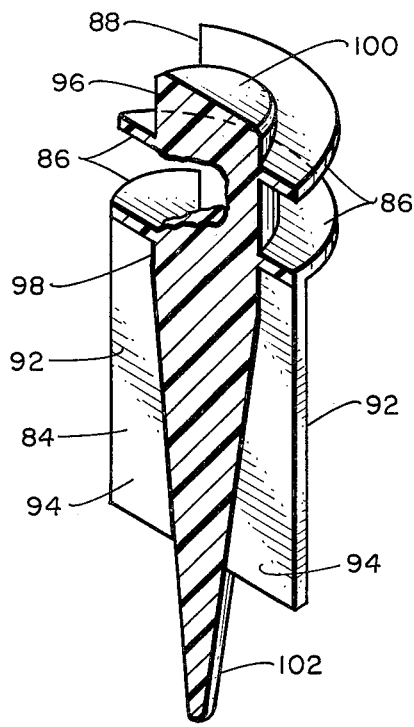
FIG. 7 is a vertical sectional view looking in the direction of the arrows 7—7 in FIG. 6.

Again quite important to certain of the principles of the present invention, a preferably plastic, flow diverter generally indicated at 84 is secured in the upper end 78 of the water outlet tube 80 projecting partially upwardly therefrom, the diverter being shown in assembled operable position in FIGS. 3, 4 and 5, and separately in FIGS. 6 and 7. When the water outlet tube 80 is assembled with the flow discharge stub 74 of the valve housing 12, the upper end of the flow diverter 84 is within the flow discharge stub spaced just slightly vertically downwardly from a main part of the valve housing outlet portion 22. For the particular use shown, this has been found to provide the most desirable flow characteristics as will be hereinafter discussed, but the positioning of this flow diverter can be varied slightly to provide the maximum desirable flow characteristics in the particular use to which it is applied.

Starting at its upper end, the flow diverter 84 is formed with a pair of vertically spaced, downwardly extending, helical grooves 86 having upper inlet openings 88 preferably spaced 180° apart and lower outlet openings 90 similarly spaced apart. Each of the helical grooves 86 opens spirally through its particular outlet opening 90 into one of a pair of vertical grooves 92 also formed in the flow diverter 84. The vertical grooves 92 are spaced horizontally apart at either side by horizontally spaced, pairs of vertically and generally radially extending, flat blade portions 94 which terminate radially inwardly in a cylindrical wall 96 in a groove upper portion and an inverted conical wall 98 in a groove lower portion. In other words, starting at the upper extremities of the vertical grooves 92, the diverter 84 is formed centrally with a cylinder 100 projecting downwardly forming the opposite groove cylindrical walls 96 and then centrally downwardly in an inverted cone 102 extending downwardly spaced below the lower terminations of the flat blade positions 94 forming the opposite groove inverted conical walls 98, the flat blade portions 94 at common sides of the vertical grooves preferably being circumferentially spaced apart forming diametrically opposite voids 104.

Thus, as the flow diverter 84 is oriented relative to the valve housing outlet portion 22, the helical grooves 86 are positioned at the downward edge of the valve housing outlet portion receiving horizontal liquid or water flow therefrom generally horizontally and slightly angled downwardly into the inlet openings 88 of the helical grooves 86. The helical grooves 86 carry the flow progressively downwardly in spiral paths and from the outlet openings 90 thereof in such spiral paths against the flat blade portions 94 of the vertical grooves 92 where the flow is then directed generally vertically downwardly first in uniform cross sections of the vertical groove and then in progressively expanding cross sections of the vertical grooves ultimately discharging such flow vertically downwardly into the remainder of the water outlet tube 80. Obviously, as shown, the vertical grooves 92 are initially much larger in cross section than the helical grooves 86 and ultimately progressively increase even larger for discharge into the water outlet tube 80. For maximum efficiency in the particular preferred embodiment construction shown, each of the vertical grooves 92 is formed extending in the order of 120° of circumference and the voids 104 therebetween are each formed in the order of 60° of circumference.

In a description of the operation of the preferred embodiment of the side inlet ballcock wherein the improvements of the present invention will be more fully explained, assume that the side inlet ballcock is in a typical installation as shown controlling the liquid level, in this case water level, in a toilet flush tank. The ballcock will be assembled as shown in FIGS. 1, 2, 3 and 8 with the float guide 62 in generally vertical position retained therein by interference engagement of the float guide bars 70 in the guide bracket slots 72 and with the water outlet tube 80 in place extending vertically downwardly retained with the flow discharge stub 74 by the bayonet joint therebetween. Further assume that the water level in the toilet flush tank 16 is at its maximum desired level (not shown) retaining the float 54 at its maximum upper level as determined by its setting with its connector bracket 56 so that the valve 24 is in its closed position as shown retaining an inlet water supply under pressure totally within the valve housing inlet portion 20 against the valve sealing member 26.

Water is discharged from the toilet flush tank 16 lowering the water level therein which permits the float 54 to slide downwardly along the float guide 62 and through the float connector 48 pivot the valve control arm 42 downwardly from the position shown. This moves the valve pilot pin 38 outwardly opening the pilot valve 36 and permitting the valve sealing member 26 to be forced away from the valve seat 30 opening the flow openings 32 and, in turn, permitting the water to flow horizontally through the valve housing inlet portion 20 outwardly along the valve sealing member 26 and horizontally reversely through the valve seat 30 and anti-syphon member 34 into the valve housing outlet 22. As the water flows horizontally reversely along the valve housing outlet portion 22 it ultimately generally horizontally enters the inlet openings 88 of the flow diverter helical grooves 86 and is directed spirally and progressively vertically downwardly exiting from the helical groove outlet openings 90 into the flow diverter vertical grooves 92.

As the water flow passes through the flow diverter helical grooves 86, it has begun to be converted from horizontal toward vertical flow by the spiral paths of the helical grooves. As the water reaches the upper ends of the larger flow diverter vertical grooves 92 entering in a downward spiral path, it is permitted to expand reducing the pressure and velocity thereof due to the expanded volume of the vertical grooves between the flat blade portions 94 and around the cylindrical walls 96. The water then progresses vertically downwardly as directed by the vertical grooves 92 further expanding due to the progressively further increasing volume in the vertical grooves against the inverted conical walls 98. The end result as the water fully expands from the lower termination of the flow diverter 84 into the remainder of the water outlet tube 80 to finally flow into the tank 16 is that the water flow has been converted from the generally horizontal flow of the valve housing outlet portion 22 into substantially vertical flow within the lower portion of the water outlet tube 80.

Obviously, this redirection of flow from the valve housing outlet portion 22 into the water outlet tube 80 is an extreme right angle redirection required in all side inlet ballcocks of the type herein involved and in the prior constructions not including the unique flow diverter 84 of the present invention, this flow redirection creates considerable turbulance which persists on downwardly in the water outlet tube and into the tank 16 resulting in objectionable water flow noises of considerable magnitude. However, with the flow diverter 84 of the present invention, this flow redirection is accomplished relatively smoothly, first generally horizontally from the valve housing outlet portion 22 into the flow diverter helical grooves 86 beginning its progressive vertically downward conversion and then into the vertical grooves which are larger than the helical grooves for its completion of vertically downward conversion. During its downwardly directed flow and its progressive expansion within the flow diverter vertical grooves 92, the conversion to direct vertical flow is substantially complete by the time the flow ultimately expands fully into the water outlet tube 80 beneath the flow diverter 84 so as to flow smoothly with minimum noise generation ultimately into the tank 16.

Completing the operation of the ballcock, as the water flow from the water outlet tube 80 begins to refill the tank 16, the float 54 ultimately begins to move slideably upwardly along the float guide 62 so as to pivot the valve control arm 42 upwardly ultimately back into the position shown in FIGS. 1 and 3. This pivoting of the valve control arm 42 upwardly moves the pilot pin 38 back inwardly actuating the pilot valve 36 to force the valve sealing member 26 back into its position shown sealing off the valve seat 30 and stopping the water flow from the valve housing inlet portion 20 into the outlet portion 22. The ballcock is, therefore, again in the valve closed position and will remain therein until the water level in the tank 16 is once again lowered by water discharge therefrom.

As hereinbefore pointed out and according to certain of the principles of the present invention, the float guide 62 has been described as pivotally connected to the guide bracket 66 of the valve housing 12, and the water outlet tube 80 has been described as selectively removably connected to the flow discharge stub 74 of the valve housing. As will be described, these construction features are for purposes of providing economy in storage and shipment of the side inlet ballcocks of the present invention prior to ultimate installation and use. Viewing the side inlet ballcock as shown in FIG. 1, it can be seen that the ballcock extends markedly both horizontally and vertically so that in this final assembled position, it presents a relatively bulky article from the space consumption standpoint.

However, after manufacture and assembly and without the float guide 62 pivoted to engage the float guide bars 70 in interference fit in the slots 72 of the guide bracket 66, the float guide may be pivoted upwardly toward the valve control arm 42 carrying the float 54 and the float connector 48 therewith. During this pivotal movement of the float guide 62, the float 54 is free to slideably adjust relative thereto, and the float connector 48 can not only pivot about the outer end of the valve control arm 42, but can be adjusted relative to the float through the adjustment clip 52. At the same time, the water outlet tube 80 may be removed from the flow discharge stub 74 of the valve housing 12 by release of the bayonet joint therebetween and such water outlet tube may be positioned horizontally parallel to the valve housing 12.

Figure 9:
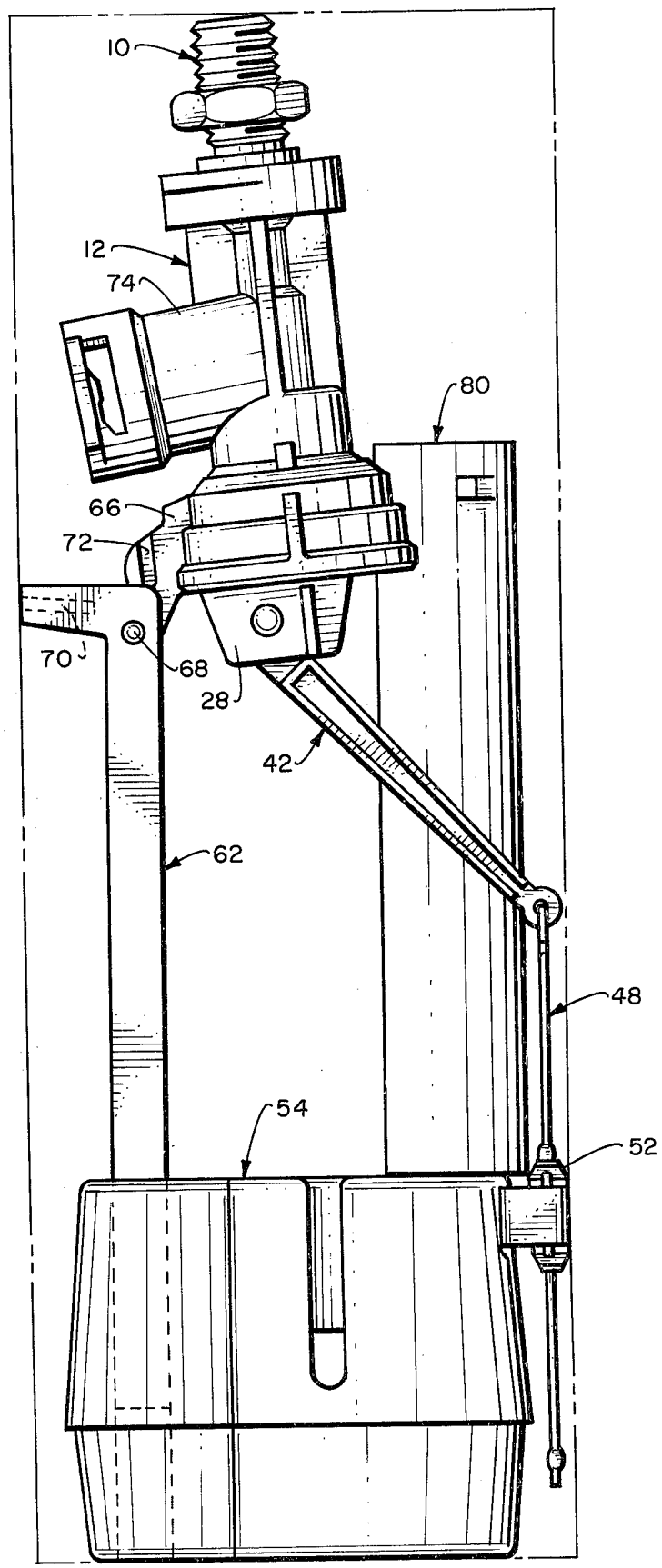
FIG. 9 is a side elevational view of the side inlet ballcock of FIG. 1 in folded, partially disassembled form ready to be packaged for storage and shipment according to the principles of the present invention.

This, therefore, places the side inlet ballcock in a folded position as shown in FIG. 9. The float guide 62 has been pivoted upwardly approaching horizontally parallel to the water inlet tube 10, valve housing 12 and valve control arm 42 carrying the float connector 48 and float 54 therewith, while the water outlet tube 80 has been removed and positioned similarly horizontally parallel. This thereby now presents a longer, but more slender contour which is more economically packaged for storage and shipment.

Furthermore, at the site of use, it is merely necessary to pivot the float guide 62 downwardly away from the valve control arm 42, the float 54 again sliding relative thereto and the float connector 48 again being adjustable as required. Ultimate interference engagement of the float guide bars 70 with the guide bracket slots 72 will secure the float guide 62 in proper operable position. The attachment of the water outlet tube 80 will complete the assembly and the side inlet ballcock will be ready for use.

Although a preferred embodiment of side inlet ballcock has been illustrated and described herein incorporating both the flow improvements and the structural improvements of the present invention, it is obvious to those skilled in the art that either of these improvements may be used separately and distinct advantages will be presented and obtained thereby. Furthermore, it is not intended to limit the principles of the present invention to the specific embodiment shown, but rather such principles should be broadly construed and only modified within the express limitations of the appended claims including the patent equivalents thereof.

I claim:

1. In a side inlet ballcock of the type having a generally horizontal valve inlet portion directing water through a float controlled valve into a generally horizontal valve outlet portion and from said valve outlet portion downwardly into a generally vertical outlet tube; the improvements including: a flow diverter at upper initiation of said outlet tube having a progressively downwardly extending, generally helical groove formed therein terminating downwardly in a generally vertical groove formed therein, said helical groove having an upper, generally horizontally extending inlet positioned receiving a generally horizontal flow of water from said generally horizontal valve outlet portion directly into a spiral flow pattern and a lower outlet directing said spiral flow into an upper inlet of said vertical groove, said vertical groove having a lower outlet directing said flow downwardly into said outlet tube, said vertical groove being of greater horizontal cross-section throughout than cross-section of said helical groove and of less horizontal cross-section throughout than horizontal cross-section of said outlet tube; said horizontal flow of water from said valve outlet portion being first directed horizontally into a downward spiral by said diverter helical groove and ultimately into a straight downward expanded flow by said diverter vertical groove for substantially straight downward and further expanded flow through and from said outlet tube.

2. In a side inlet ballcock as defined in claim 1 in which said diverter vertical groove has a horizontal cross-section at said lower outlet larger than horizontal cross-section of said upper inlet thereof so as to expand said flow of water therein.

3. In a side inlet ballcock as defined in claim 1 in which said diverter includes said helical groove being one of a pair of similar size vertically adjacent helical grooves having upper inlets spaced apart and each positioned generally horizontally receiving said generally horizontal flow of water from said generally horizontal valve outlet portion, said vertical groove being one of a pair of similar size horizontally adjacent vertical grooves each having an upper inlet receiving said flow from a lower outlet of one of said helical grooves, each of said vertical grooves having a lower outlet directing its flow downwardly into said outlet tube, the sum of the horizontal cross-sections of said pair of vertical grooves being less than the horizontal cross-section of said outlet tube.

4. In a side inlet ballcock as defined in claim 1 in which said diverter includes said helical groove being one of a pair of similar size vertically adjacent helical grooves having upper inlets spaced apart and each positioned generally horizontally receiving said generally horizontal flow of water from said generally horizontal valve outlet portion, said vertical groove being one of a pair of similar size horizontally adjacent vertical grooves each having an upper inlet receiving said flow from a lower outlet of one of said helical grooves, each of said vertical grooves having a lower outlet directing its flow downwardly into said outlet tube, the sum of the horizontal cross-sections of said pair of vertical grooves being less than the horizontal cross-section of said outlet tube, each of said vertical grooves in horizontal cross-section extending in the order of 120° of circumference of said outlet tube.

5. In a side inlet ballcock as defined in claim 1 in which said diverter includes said helical groove being one of a pair of similar size vertically adjacent helical grooves having upper inlets spaced apart and each positioned generally horizontally receiving said generally horizontal flow of water from said generally horizontal valve outlet portion, said vertical groove being one of a pair of similar size horizontally adjacent vertical grooves each having an upper inlet receiving said flow from a lower outlet of one of said helical grooves, each of said vertical grooves having a lower outlet directing its flow downwardly into said outlet tube, the sum of the horizontal cross-sections of said pair of vertical grooves being less than the horizontal cross-section of said outlet tube, said vertical grooves being separated in said outlet tube by generally radially extending and generally vertical flat blade portions.

6. In a side inlet ballcock of the type having a generally horizontal valve inlet portion directing water through a float controlled valve into a generally horizontal valve outlet portion and from said valve outlet portion downwardly into a generally vertical outlet tube; the improvements include: a flow diverter at upper initiation of said outlet tube having a progressively downwardly extending, generally helical groove formed therein terminating downwardly in a generally vertical groove formed therein, said helical groove having an upper inlet positioned receiving a generally horizontal flow of water from said valve outlet portion and a lower outlet directing said flow in a spiral into an upper inlet of said vertical groove, said vertical groove being defined by generally radially extending side portions terminating radially inwardly in a generally cylindrical wall at an upper portion of said vertical groove and an inverted conical wall at a lower portion of said vertical groove, said vertical groove having a lower outlet directing said flow downwardly into said outlet tube; said horizontal flow of water from said valve outlet portion being first directed into a downward spiral by said diverter helical groove and ultimately into a straight downward flow by said diverter vertical groove for substantially straight downward flow through and from said outlet tube.

7. In a side inlet ballcock as defined in claim 6 in which said diverter vertical groove at said upper portion and said upper inlet is of substantially uniform horizontal cross-section down to said lower portion and then progressively increasing in horizontal cross-section throughout said lower portion down to said lower outlet, said vertical groove at said upper inlet having said horizontal cross-section spaced larger than cross-section of said helical groove.

8. In a side inlet ballcock of the type having a generally horizontal valve inlet portion directing water through a float controlled valve into a generally horizontal valve outlet portion and from said valve outlet portion downwardly into a generally vertical outlet tube; the improvements including: a flow diverter at upper initiation of said outlet tube having a progressively downwardly extending, generally helical groove formed therein terminating downwardly in a generally vertical groove formed therein, said helical groove having an upper inlet positioned receiving a generally horizontal flow of water from said valve outlet portion and a lower outlet directing said flow in a spiral into an upper inlet of said vertical groove, said vertical groove having a lower outlet directing said flow downwardly into said outlet tube; said diverter helical groove being one of a pair of vertically adjacent helical grooves having upper inlets spaced apart and each positioned receiving said generally horizontal flow of water from said valve outlet portion, said vertical groove being one of a pair of horizontally adjacent vertical grooves each having an upper inlet receiving said flow from a lower outlet of one of said helical grooves, each of said vertical grooves having a lower outlet directing its flow downwardly into said outlet tube, said vertical grooves being separated horizontally by generally radially extending and generally vertically extending flat blades terminating centrally of said outlet tube in a vertical cylindrical portion at an upper part of said vertical grooves and an inverted conical portion at a lower part of said vertical grooves; said horizontal flow of water from said valve outlet portion being first directed into a downward spiral by said diverter helical grooves and ultimately into a straight downward flow by said diverter vertical grooves for substantially straight downward flow through and from said outlet tube.

9. In a side inlet ballcock as defined in claim 8 in which said diverter includes each of said vertical grooves having a horizontal cross-section throughout spaced larger than the cross-section of its respective helical groove.

* * * * *